United States Patent
Pavageau et al.

(10) Patent No.: US 10,584,294 B2
(45) Date of Patent: Mar. 10, 2020

(54) SLURRY SUSPENSION COMPRISING TORREFIED WOOD PARTICLES

(71) Applicant: RHODIA OPERATIONS, Paris (FR)

(72) Inventors: Bertrand Pavageau, Villenave d'Ornon (FR); Ling Qi, Shanghai (CN); Jean-Christophe Castaing, Sevres (FR); Rawad Tadmouri, Bordeaux (FR); Hélène Fay, Bordeaux (FR); Robert Gresser, Vernouillet (FR)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 15/539,255

(22) PCT Filed: Dec. 23, 2014

(86) PCT No.: PCT/CN2014/094595
§ 371 (c)(1),
(2) Date: Jun. 23, 2017

(87) PCT Pub. No.: WO2016/101120
PCT Pub. Date: Jun. 30, 2016

(65) Prior Publication Data
US 2018/0016507 A1    Jan. 18, 2018

(51) Int. Cl.
*C10L 1/32* (2006.01)
*C10L 5/44* (2006.01)

(52) U.S. Cl.
CPC ............. *C10L 1/322* (2013.01); *C10L 5/447* (2013.01); *C10L 2200/0259* (2013.01); *C10L 2200/0469* (2013.01); *C10L 2250/06* (2013.01); *C10L 2290/24* (2013.01); *Y02E 50/10* (2013.01); *Y02E 50/15* (2013.01); *Y02E 50/30* (2013.01)

(58) Field of Classification Search
CPC combination set(s) only.
See application file for complete search history.

(56) References Cited

U.S. PATENT DOCUMENTS

| | | | |
|---|---|---|---|
| 3,977,894 A | 8/1976 | White et al. | |
| 4,128,436 A | 12/1978 | O'Hara et al. | |
| 4,201,552 A | 5/1980 | Rowell et al. | |
| 4,251,229 A | 2/1981 | Naka et al. | |
| 4,251,230 A | 2/1981 | Sawyer, Jr. | |
| 4,479,806 A * | 10/1984 | Funk | C10L 1/32 44/280 |

(Continued)

FOREIGN PATENT DOCUMENTS

| | | |
|---|---|---|
| CN | 101768487 A | 7/2010 |
| EP | 0062220 A2 | 10/1982 |

(Continued)

OTHER PUBLICATIONS

Jaap Koppejan, et al., "Status overview of torrefaction technologies", IEA Bioenergy Task 32 report, 2012, Final Report.

(Continued)

*Primary Examiner* — Ellen M McAvoy
*Assistant Examiner* — Chantel L Graham

(57) ABSTRACT

A slurry suspension is provided, which comprises (a) carbonaceous material particles having an average diameter $D_{50}$ comprised between 0.1 μm and 200 μm; (b) an organic compound comprising at least one amine group; and (c) an organic phase.

19 Claims, 1 Drawing Sheet

(56) References Cited

U.S. PATENT DOCUMENTS

| | | | |
|---|---|---|---|
| 4,492,590 | A | 1/1985 | Schick et al. |
| 2011/0239973 | A1 | 10/2011 | Qin |
| 2012/0172207 | A1* | 7/2012 | Nguyen .................. B01J 23/24 502/167 |
| 2014/0249237 | A1* | 9/2014 | Ferraro .................. C10B 49/02 518/704 |
| 2015/0140448 | A1* | 5/2015 | Takiguchi ......... H01M 10/0567 429/332 |

FOREIGN PATENT DOCUMENTS

| | | |
|---|---|---|
| FR | 2519019 A1 | 7/1983 |
| GB | 1549532 | 8/1979 |
| JP | 2007254696 A | 10/2007 |
| WO | 2012143552 A1 | 10/2012 |
| WO | 2012155413 A1 | 11/2012 |

OTHER PUBLICATIONS

Michael Temmerman, et al., "Von Rittinger theory adapted to wood chips and pellet milling, in a laboratory scale hammermill", Biomass & Bioenergy, 2013, vol. 56, pp. 70-81.

Nobusuke Kobayashi, "A new pulverized biomass utilization technology", Powder Technology, 2008, vol. 180, Issue 3, pp. 272-283.

Susanne Paulrud, et al., "Particle and handling characteristics of wood fuel powder: effects of different mills", Fuel Processing Technology, 2002, vol. 76, Issue 1, pp. 23-39.

Vaghela Kalpesh, "Review of charcoal-diesel slurry: an alternative fuel for compression ignition engine", International Journal of Advanced Engineering Research and Studies, 2012, vol. 1, Issue 111, pp. 143-147.

Elisa S. Mosa, et al., "Effect of chemical additives on flow characteristics of coal slurries", Physicochemical Problems of Mineral Processing, 2008, vol. 42, pp. 107-118.

Silvia Comba, Rajandrea Sethi, "Stabilization of highly concentrated suspensions of iron nanoparticles using shear-thinning gels of xanthan gum", Water Research, 2009, vol. 43, Issue 15, pp. 3717-3726.

Gustavo A. Nunez, "Colloidal coal in water suspensions", Energy & Environmental Science, 2010, vol. 3, Issue 5, pp. 629-640.

R. Patton, et al., "Coal vs. charcoal-fueled diesel engines: a review", Energy Sources, Part A: Recovery, Utilization, and Environmental Effects, 2010, vol. 32, Issue 4, pp. 315-322.

Di Blasi C., "Combustion and gasification rates of lignocellulosic chars", Progress in Energy and Combustion Science, 2009, vol. 35, pp. 121-140, pp. 121-140.

Valentin Soloiu, "Combustion characteristics of a charcoal slurry in a direct injection diesel engine and the impact on the injection system performance", Energy, 2001, vol. 36, Issue 7, pp. 4353-4371.

Ping Feng, et al., "Rheological behavior of coal bio-oil slurries", Energy, 2014, vol. 66, pp. 744-749.

Liu Jianzhong, et al., "Pilot-scale investigation on slurrying, combustion, and slagging characteristics of coal slurry fuel prepared using industrial wasteliquid", Applied Energy, 2014, vol. 115, pp. 309-319.

U.S. Appl. No. 15/539,246, filed Jun. 23, 2017.
U.S. Appl. No. 15/539,261, filed Jun. 23, 2017.

* cited by examiner

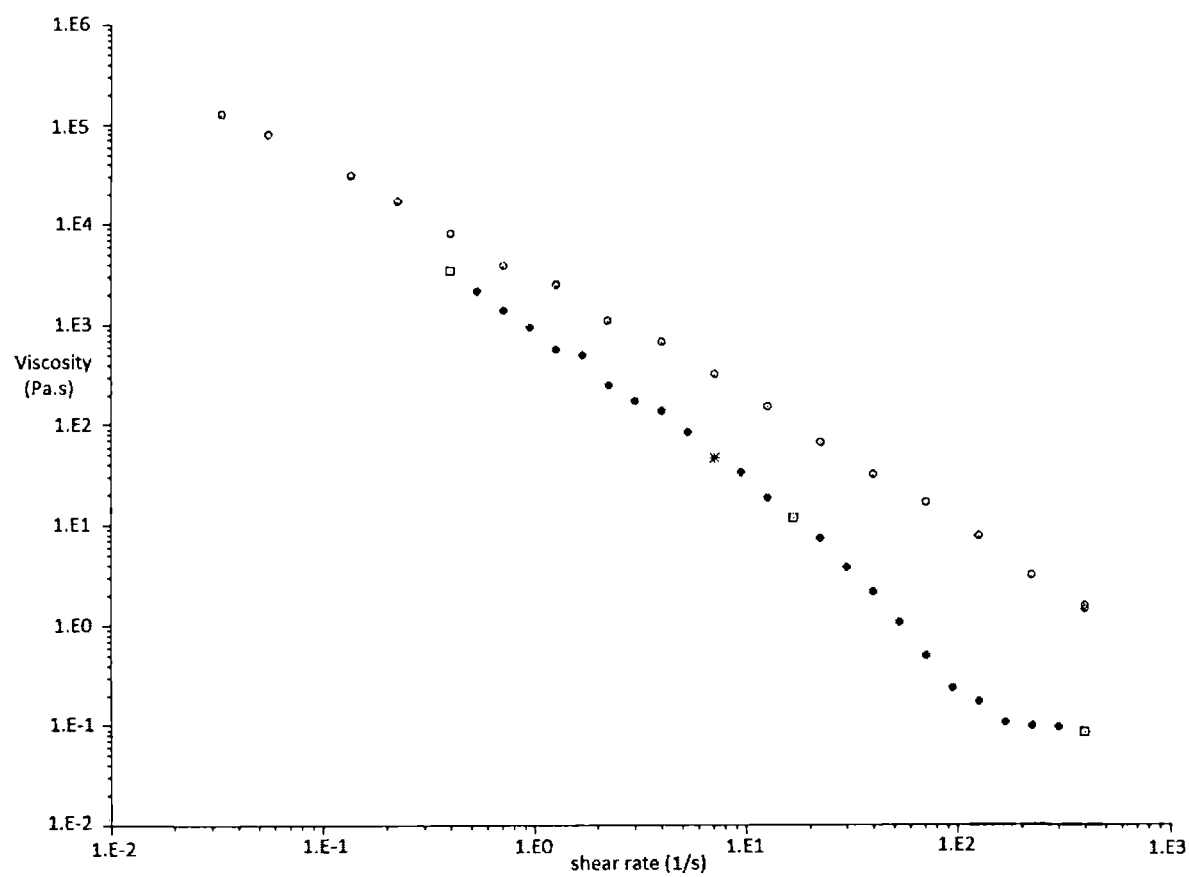

SLURRY SUSPENSION COMPRISING TORREFIED WOOD PARTICLES

This application is a U.S. national phase entry under 35 U.S.C. § 371 of International Application No. PCT/CN2014/094595, filed on Dec. 23, 2014. The entire content of this application is explicitly incorporated herein by this reference.

FIELD OF THE INVENTION

The present invention relates to the field of liquid fuel combustible.

In particular, the invention relates to a slurry suspension comprising carbonaceous material particles, at a micrometre scale, a fossil-based or biomass-based organic phase, organic compound comprising at least one amine group and optionally a viscosity controlling agent.

STATE OF THE ART

In order to reduce the emission of sulphur from the combustion of fuel, which pollutes the environment, and be compatible with the Regulations relating to fuel consumption, oil refineries rendered available low sulphur content fuel, made up with refined heavy fuel of diesel fuel. However, due to a costly process, these fuel alternatives are usually more expensive than the less refined ones.

In addition, because of the expected shortage of crude oil due to the decline in natural reserves it is more than ever urgent to find some efficient alternatives to reduce the portion of fossil-based energy sources.

Another alternative to further refined fuel is to replace fossil-based combustible with biofuels, which development usually aims to design new catalytic process to convert solid biomass into liquid fuel. Again, this disruptive process usually suffers for competitive price to make biofuel or biofuel from 1G biomass where a competition with food exists.

Some other alternatives were recently proposed to increase the renewable fuel part. For example, white pellets may be used as a solid fuel with specific boiler design, whereas a technology based on a coal/water slurry (CWS), for which the coal is dispersed into water, provides a liquid fuel compatible with existing liquid boilers.

However, the disadvantage of coal/water slurries is that the water is inert to combustion, and therefore reduces the gross calorific value of aqueous coal or biocoal suspensions.

Another alternative that may be explored is the use of torrefied biomass for producing renewable energy with cost-competitive aspects and mainly for transportation regarding the high energy density material compared to white untorrefied biomass.

This "thermal processed biomass" offer interesting properties, such as low sulphur content, low nitrogen content, and excellent combustion properties.

Furthermore, torrefied biomass is an inert material compared to white biomass and the material get hydrophobic properties due to the loss of oxygen during the torrefaction process. So the material is naturally self-compatible into some organic solvents (fuels).

It is hence desired to provide liquid combustible formulations resulting in low sulphur emission, for which the fossil-based energy source accounts for only a reduced portion.

More particularly, because carbonaceous materials offer good combustion properties, there is still a need in the art for the provision of suspension comprising said carbonaceous materials in a liquid vehicle, said suspension being homogeneously and stably dispersed.

It is also desired to provide liquid combustible formulations that are compatible with the existing systems, such as engines and boilers.

SUMMARY OF THE INVENTION

A first aspect of the invention relates to a slurry suspension comprising:
  (a) carbonaceous material particles having an average diameter $D_{50}$ comprised between 0.1 μm and 200 μm;
  (b) an organic compound comprising at least one amine group; and
  (c) an organic phase.

Another aspect of the invention relates to a method for the preparation of a slurry suspension according to the invention comprising at least the mixing of:
  a) carbonaceous material particles having an average diameter $D_{50}$ comprised between 0.1 μm and 200 μm;
  b) an organic compound comprising at least one amine group; and
  c) an organic phase, and optionally
  d) a viscosity controlling agent.

A still another aspect of the invention relates to a method for generating power comprising combustion of the slurry suspension according to the instant invention.

Another aspect of the invention relates to the use of an organic compound comprising at least one amine group and optionally a viscosity controlling agent for providing a stable and redispersible slurry suspension comprising carbonaceous material particles having an average diameter $D_{50}$ comprised between 0.1 μm and 200 μm.

LEGEND OF THE FIGURE

FIG. 1: Viscosity of slurries comprising 30% of torrefied wood and palm oil, in the presence (open circles) or the absence (closed circles) of 2% of ethylenediamine. Shear rate conditions vary from 0.03 $s^{-1}$ to 400 $s^{-1}$.

DETAILED DESCRIPTION OF THE INVENTION

The inventors surprisingly found that carbonaceous material particles, e.g. torrefied wood particles, grinded at the micrometre scale, may be efficiently dispersed in an organic oily phase with the help of an organic compound comprising at least one amine group. The organic compound comprising at least one amine group allows for stabilizing the slurry suspension, by delaying the sedimentation of said particles in the organic phase. Moreover, the addition of a viscosity controlling agent allows to obtain a slurry suspension having a higher viscosity at rest, which further contribute to slow down the sedimentation process and having a lower viscosity under high shear conditions, which in turn permits a rapid and efficient dispersion of the particles in the organic phase under soft agitation, and hence the use of this homogeneous slurry suspension for combustion.

Slurry Suspension

Hence, a first aspect of the invention relates to a slurry suspension comprising:
  (a) carbonaceous material particles having an average diameter $D_{50}$ comprised between 0.1 μand 200 μm;

(b) an organic compound comprising at least one amine group; and (c) an organic phase.

Carbonaceous Material Particles

Within the scope of the instant invention, the term "carbonaceous material" refers to a material containing a large content of carbon. Thus, the carbon content of carbonaceous material particles useful for the present invention typically exceeds 30 wt. %, based on the total weight of the carbonaceous material particles; it is often above 40 wt. %. It is preferably above 45 wt. %, and more preferably above 50 wt. %, based on the total weight of the carbonaceous material particles. On the other hand, it is typically of at most 90 wt. %, and often of at most 80 wt. % .%, based on the total weight of the carbonaceous material particles. It can be of at most 70 wt. % or even of at most 60 wt. %, based on the total weight of the carbonaceous material particles. Certain useful ranges for the carbon content of carbonaceous material particles useful for the present invention are either from about 40 wt. % to about 80 wt. %, or from about 45 wt. % to about 75 wt. %, based on the total weight of the carbonaceous material particles. The carbon content of the carbonaceous material particles can be determined by any method known to the skilled person. For example, it can be determined by drying the carbonaceous material particles for 12 h at 100° C. in an oven (to remove water and other volatiles), then keeping the dried particles in a dessicator (to avoid water pickup), then burning the carbonaceous material particles in a burning oven under conditions capable of converting essentially the whole (when not, the whole) carbon content of the carbonaceous material particles into carbon dioxide and quantifying the C content (through the $CO_2$ formed by the combustion) by infrared detection.

In one embodiment, the carbonaceous material particles are selected in a group comprising a vegetal biomass, a coal, a coke, a graphite, a char, a biocoal and a mix thereof.

According to the present invention, a vegetal biomass comprises ligno-cellulosic fibers, and may be provided by any plant, wood and crop susceptible to provide suitable biomass.

Plants such as miscanthus, switchgrass, hemp; woods such as poplar, bamboo, eucalyptus, oil palm, willow, pine, oak, gum, aspen, beech, coconut tree and spruce; and crops such as corn, sorghum, sugarcane and beet are suitable for implementing the instant invention.

In certain embodiments, the vegetal biomass is selected in a group comprising a plant or a part thereof (e.g. leave, stem, root), including a crop or a part thereof; a wood, a wood chip or a wood sawdust; a straw; a bark; a grass; a forestry residue; an agricultural waste such as corn cobs, corn stover, corn stalk, wheat straw, bamboo grass, vine shoots, sugar cane bagasse, sorghum bagasse, almond shells, sunflower seed hulls and a mixture thereof.

In certain embodiments, the vegetal biomass has been subjected to a treatment in order to remove its water content, such treatment being a dry heat treatment, steam explosion, vacuum evaporation, hydrothermal carbonization, or any suitable treatment known from the state of the art.

A dry heat treatment method may encompass a treatment of the starting biomass at a temperature below 200° C. to a maximum temperature of 500° C., for a period of time from several minutes to several hours.

In certain embodiments, the dry heat treatment consists of torrefaction, which is performed at a temperature ranging from about 280° C. to about 320° C., for a period of time ranging from 1 min to 15 min, preferably from 2 min to 8 min In certain preferred embodiments, the vegetal biomass is a torrefied vegetal biomass, preferably torrefied wood particles.

In certain embodiments, the carbonaceous material is coal, such as anthracite, semi-anthracite, charcoal, solvent refined coal, medium and high-volatile bituminous, sub-bituminous, and lignite coals.

In certain embodiments, the carbonaceous material is coke, such as petroleum coke, high temperature coke, foundry coke, low temperature coke, medium temperature coke, pitch coke, or any product obtained by carbonization of coal, pitch, petroleum residues, and certain other carbonaceous materials.

In certain embodiments, mixtures of coal and petroleum coke can be used in this invention.

When referring to "carbonaceous material particles", one may understand that said particles have low water content or are water-less. By "low water content", one may understand a water content that is at most 20% in weight as compared to the weight of the starting material. Hence, at most 20% in weight of water encompasses a water content of 0%, 1%, 2%, 3%, 4%, 5%, 6%, 7%, 8%, 9%, 10%, 11%, 12%, 13%, 14%, 15%, 16%, 17%, 18%, 19% and 20% in weight as compared to the weight of the starting material.

Within the scope of the invention, the "carbonaceous material particles" refer to particle of a carbonaceous material in a solid state.

The carbonaceous material particles encompassed by the invention are obtained after a fine wet or dry grinding of the carbonaceous material, using a grinding mill. When performing a wet grinding, the carbonaceous material particles may be further handled as to undergo a dry heat treatment intended to reduce its water content to a maximum of 20%. Oppositely, when performing a dry grinding, the carbonaceous material particles according to the invention have a water content of % in weight as compared to the weight of the starting material.

In certain embodiments, the carbonaceous material particles provide the size distribution as follows:

$D_{10}$ comprise between 1 and 50 μm, and $D_{90}$ comprise between 50 and 500 μm.

Within the scope of the invention, the size of the particles may be measured by any mean known from the state of the art.

In certain embodiments, the size distribution of the particles is measured by the mean of laser diffraction by dry dispersion, respecting the principles and basic rules set out in ISO 13320:2009 (E).

In practice, the analysis is performed using a Helos H1302 laser diffraction sensor (Sympatec, Germany).

The detector of the focal length is selected so that its pass band covers the size range of the carbonaceous material particles to be analysed.

For example, when analysing a milled torrefied biomass, R4 detector (0.5 μm to 350 μm) is particularly well adapted.

The carbonaceous material particles are dispersed in a stream of dry nitrogen under pressure using a dry dispersing unit (Rodos, Sympatec, Germany).

The optimum operating conditions are sought experimentally to obtain a good dispersion of particles, without crushing in the ejector. In practice, when analysing carbonaceous material particles in the form of ground torrefied biomass, the nitrogen pressure is about 100 kPa (1 bar) and the depression represents about 4 kPa (40 mbar).

The carbonaceous material particles are fed using a vibrating chute. The feed rate is adjusted so as to obtain an optical concentration between 2% and 10%.

In practice the total mass of the sample containing the carbonaceous material particles to be analysed ranges from about 1 g to about 10 g, preferably about 5 g.

Laser diffraction data were acquired and analysed using the Windox 5 software (Sympatec, Germany).

In certain embodiments, the carbonaceous material particles represent between 25% to 50% by weight of the total weight of the suspension.

Organic Compound Comprising at Least One Amine Group

Within the scope of the invention, an organic compound comprising at least one amine group is intended to provide an environment in which the carbonaceous material particles are homogeneously dispersed within the organic phase. In other words, an organic compound comprising at least one amine group according to the invention promotes the stability of the slurry suspension, by preventing or slowing down the sedimentation process of the carbonaceous material particles in the organic phase. In certain embodiments the organic compound comprising at least one amine group is selected in a group comprising asaturated or unsaturated, linear, branched or cyclic, aliphatic or aromatic hydrocarbon chain substituted monoamine, saturated or unsaturated, linear, branched or cyclic, aliphatic or aromatic hydrocarbon chain substituted diamine, saturated or unsaturated, linear, branched or cyclic, aliphatic or aromatic hydrocarbon chain substituted polyamine and a mix thereof.

With the scope of the present invention, the expression "saturated or unsaturated, linear, branched or cyclic, aliphatic or aromatic hydrocarbon chain" relates to a hydrocarbon group that may present alkyl groups, alkenyl groups, alkynyl groups, aryl groups, alkylaryl groups, aryalkyl groups, heterocyclic groups, and/or alkylheterocyclic groups.

The "alkyl" group includes saturated hydrocarbons having one or more carbon atoms, including straight-chain alkyl groups, such as methyl, ethyl, propyl, butyl, pentyl, hexyl, heptyl, octyl, nonyl, decyl, cyclic alkyl groups (or "cycloalkyl" or "alicyclic" or "carbocyclic" groups), such as cyclopropyl, cyclopentyl, cyclohexyl, cycloheptyl, and cyclooctyl, branched-chain alkyl groups, such as isopropyl, tert-butyl, sec-butyl, and isobutyl, and alkyl-substituted alkyl groups, such as alkyl-substituted cycloalkyl groups and cycloalkyl-substituted alkyl groups.

The term "aliphatic group" includes organic moieties characterized by linear or branched chains, typically having between 1 and 22 carbon atoms. In complex structures, the chains may be branched, bridged, or cross-linked. Aliphatic groups include alkyl groups, alkenyl groups, and alkynyl groups.

The "alkenyl" or "alkenyl group" refers to an aliphatic hydrocarbon radical which can be linear or branched and contain at least one carbon-carbon double bond. Examples of alkenyl groups include, but are not limited to, ethenyl, propenyl, n-butenyl, i-butenyl, 3-methylbut-2-enyl, n-pentenyl, heptenyl, octenyl, decenyl, and the like.

The term "alkynyl" refers to linear or branched chain hydrocarbon groups having at least one triple carbon to carbon bond, such as ethynyl.

The term "aryl group" includes unsaturated and aromatic cyclic hydrocarbons as well as unsaturated and aromatic heterocycles containing one or more rings. Aryl groups may also be fused or bridged with alicyclic or heterocyclic rings that are not aromatic so as to form a polycycle, such as tetralin. An "arylene" group is a divalent analog of an aryl group.

The term "heterocyclic group" includes closed ring structures analogous to carbocyclic groups in which one or more of the carbon atoms in the ring is an element other than carbon, for example, nitrogen, sulfur, or oxygen. Heterocyclic groups may be saturated or unsaturated. Additionally, heterocyclic groups, such as pyrrolyl, pyridyl, isoquinolyl, quinolyl, purinyl, and furyl, may have aromatic character, in which case they may be referred to as "heteroaryl" or "heteroaromatic" groups.

Aryl and heterocyclic including heteroaryl groups may also be substituted at one or more constituent atoms. Examples of heteroaromatic and heteroalicyclic groups may have 1 to 3 separate or fused rings with 3 to about 8 members per ring and one or more N, O, or S heteroatoms. In general, the term "heteroatom" includes atoms of any element other than carbon or hydrogen, preferred examples of which include nitrogen, oxygen, sulfur, and phosphorus. Heterocyclic groups may be saturated or unsaturated or aromatic.

As used herein, the term "aralkyl" or "arylalkyl" means an alkyl group substituted with one or more aryl groups, such as, for example, phenylmethyl, phenylethyl, triphenylmethyl. The term "alkylaryl" means an alkyl moiety bound to an aryl moiety.

As used herein, the term "alkoxylated" means that the compound comprises one or more alkoxy or, more typically, poly(alkyleneoxy) moieties, such as, for example a poly (ethyleneoxy), poly(propyleneoxy), or poly(ethlyeneoxy-propyleneoxy) moiety and the term "ethoxylated" means that the compound comprises at least one ethoxy or poly (ethyleneoxy) moiety.

In certain embodiments the organic compound comprising at least one amine group represents from 0.1% to 5% by weight of the total weight of the suspension.

Monoamines

Among the saturated or unsaturated, linear, branched or cyclic, aliphatic or aromatic hydrocarbon chain substituted monoamine, one may particularly cite alkyl, alkenyl or alkynyl substituted primary monoamine, alkyl, alkenyl or alkynyl substituted secondary monoamine, alkyl, alkenyl or alkynyl substituted tertiary monoamine and alkyl, alkenyl or alkynyl substituted quaternary monoamine salt.

Suitable saturated or unsaturated, linear, branched or cyclic, aliphatic or aromatic hydrocarbon chain substituted primary monoamines may be represented by an amine of formula (I) below:

$$R1-NH_2 \qquad (I)$$

wherein R1 represents a saturated or unsaturated, linear, branched or cyclic, aliphatic or aromatic hydrocarbon chain of $C_8$-$C_{22}$.

In particular, one may cite oleylamine (CAS n° 112-90-3), commercially available under the name FENTAMINE A-O (Solvay); the coco amine (CAS n° 61788-46-3), commercially available under the name FENTAMINE A-CO (Solvay); the hydrogenated tallow ($C_{16}$-$C_{18}$) amine (CAS n° 61788-45-2), commercially available under the name FENTAMINE A-HT (Solvay); laurylamine (CAS n° 124-22-1), commercially available under the name FENTAMINE A-12 (Solvay); tallow amine (CAS n° 61790-33-8), commercially available under the name FENTAMINE A-T (Solvay).

Suitable saturated or unsaturated, linear, branched or cyclic, aliphatic or aromatic hydrocarbon chain substituted secondary monoamines may be represented by an amine of formula (II) below:

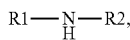
(II)

wherein R1 and R2 represent independently to one another a methyl group or a saturated or unsaturated, linear, branched or cyclic, aliphatic or aromatic hydrocarbon chain of $C_8$-$C_{22}$, with the proviso that at least R1 represents a saturated or unsaturated, linear, branched or cyclic, aliphatic or aromatic hydrocarbon chain of $C_8$-$C_{22}$.

In particular, one may cite N-cocoalkyl 1,3-propanediamines (CAS n° 61791-63-7), commercially available under the name FENTAMINE DA-CO (Solvay); N-Tallowalkyl 1,3-propanediamines (CAS n° 61791-55-7), commercially available under the name FENTAMINE DA-T (Solvay).

Suitable saturated or unsaturated, linear, branched or cyclic, aliphatic or aromatic hydrocarbon chain substituted tertiary monoamines may be represented by an amine of formula (III) below:

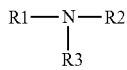
(III)

wherein R1, R2 and R3 represent independently to one another a methyl group or a saturated or unsaturated, linear, branched or cyclic, aliphatic or aromatic hydrocarbon chain of $C_8$-$C_{22}$, with the proviso that at least R1 represents a saturated or unsaturated, linear, branched or cyclic, aliphatic or aromatic hydrocarbon chain of $C_8$-$C_{22}$.

In particular one may cite the octadecyl, dimethylamine (CAS n° 124-28-7), commercially available under the name FENTAMINE DMA 1895 (Solvay); the hexadecyl, dimethylamine (CAS n° 112-69-6), commercially available under the name FENTAMINE DMA 1695 (Solvay); the dodecyl dimethylamine (CAS n° 112-18-5), commercially available under the name FENTAMINE DMA 1295 (Solvay); the decyl, dimethylamine, commercially available under the name FENTAMINE AT 1095 (Solvay); the octadecyl, hexadecyl, methylamine commercially available under the name FENTAMINE M 1816 (Solvay); octyl dimethylamine (CAS n° 7378-99-6), commercially available under the name FENTAMINE DMA 0897 (Solvay).

Suitable saturated or unsaturated, linear, branched or cyclic, aliphatic or aromatic hydrocarbon chain substituted quaternary monoamine salt may be represented by an ammonium of formula (IV) below:

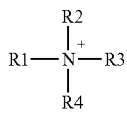
(IV)

wherein R1, R2, R3 and R4 represent independently to one another a methyl group or a saturated or unsaturated, linear, branched or cyclic, aliphatic or aromatic hydrocarbon chain of $C_8$-$C_{22}$, with the proviso that at least R1 represents a saturated or unsaturated, linear, branched or cyclic, aliphatic or aromatic hydrocarbon chain of $C_8$-$C_{22}$, and a sulphide or a chloride ion.

In particular, one may cite the di-octadecyl, dimethyl ammonium chloride, commercially available under the name FENTACARE 1821 (Solvay); the octadecyl, trimethyl ammonium chloride, commercially available under the name FENTACARE 1831 (Solvay) and the di-decyl, dimethyl ammonium chloride, commercially available under the name FENTACARE 1021 (Solvay); di(hydrogenated tallow) dimethyl ammonium chloride (CAS n° 61789-80-8), commercially available under the name FENTACARE DHT 21 75 (Solvay).

In certain embodiments, the monoamine may be an ethoxylated monoamine. Within the scope of the instant invention, an ethoxylated monoamine is a monoamine compound bearing at least one group of formula —($CH_2$—$CH_2$—O)$_n$— or at least one group of formula —(O—$CH_2$—$CH_2$)$_n$—, wherein n represents an integer ranging from 2 to 50.

In particular, one may cite the bis(2-hydroxyethyl) tallowalkyl amine(2EO) (CAS n° 61791-44-4), commercially available under the name FENTACARE T02 (Solvay); cocoamine 5EO (CAS n° 61791-14-8), commercially available under the name FENTACARE CO5 (Solvay); cocoamine 2EO (CAS n° 61791-14-8), commercially available under the name FENTACARE CO2 (Solvay); Hydrogenated tallow amine ethoxylate (CAS n° 68783-22-2; 7732-18-5), commercially available under the name RHODAMEEN HT-50 (Solvay); Ethoxylated oleyl amine (CAS n° 58253-49-9), commercially available under the name RHODAMEEN PN-430 (Solvay); and Ethoxylated tallow amine (CAS n° 61791-26-2), commercially available under the name RHODAMEEN VP532 (Solvay).

Diamines

Suitable saturated or unsaturated, linear, branched or cyclic, aliphatic or aromatic hydrocarbon chain substituted diamines may be represented by an amine of formula (V) below:

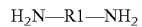
(V)

wherein R1 represents a saturated or unsaturated, linear, branched or cyclic, aliphatic or aromatic hydrocarbon chain of $C_2C_{22}$.

In particular, one may cite ethylenediamine (CAS n° 107-15-3) commercially available from the Dow Chemical company; 1,10,decyldiamine (CAS n° 646-25-3) commercially available from Solvay; hydrogenated tallow ($C_{16}$~$C_{18}$) diamine commercially available under the name FENTAMINE DA HT (Solvay).

Polyamines

Among saturated or unsaturated, linear, branched or cyclic, aliphatic or aromatic hydrocarbon chain substituted polyamines suitable to be used as organic compound comprising at least one amine group, one may cite a triamine organic compound, such as diethylenetriamine.

In certain embodiments the organic compound comprising at least one amine group is selected in a group comprising ethylenediamine, oleylamine. Without wishing to be bound to a theory, it is believed that the organic compound comprising at least one amine behaves like a polar compound stabilising the homogeneous dispersion of the carbonaceous material particles within the organic phase.

Viscosity Controlling Agent

In certain embodiments, the slurry suspension according to the invention also comprises (d) a viscosity controlling agent.

In certain embodiments, the viscosity controlling agent is selected in a group comprising a clay powder or gel, a hydrogenated castor oil, carbon black and a mix thereof.

The viscosity controlling agent is optionally added in a slurry suspension according to the invention in order to get a high viscosity at rest, e.g. mimicking storage conditions, and a low viscosity under high shear conditions, e.g. mimicking the functioning of an engine. This results in a reduced or delayed sedimentation of the carbonaceous material particles at rest, and an easier dispersion of these particles under high shear conditions.

In practice, any viscosity controlling agent known from the state of the art may be suitable.

Clay powder or gel may comprise bentonite, montmorillonite, zeolite, attapulgite and a salt thereof, preferably selected in a group comprising an ammonium salt, a phosphonium salt, an oxonium salt thereof.

In practice, examples of a viscosity controlling agent suitable for implementing the invention may be according to, e.g., U.S. Pat. Nos. n° 4,128,436 and n° 3,977,894.

For example, bentone gel or bentone powder (Elementis Specialties) are suitable compounds that may be used as a viscosity controlling agents.

In certain embodiments the viscosity controlling agent represents from 0.01% to 5%, preferably from 0.1% to 3% by weight of the total weight of the suspension.

Organic Phase

In certain embodiments, the organic phase is selected in a group comprising a fossil-based liquid or a derivative thereof, a biomass-based liquid, a synthetic organic liquid or a derivative thereof, and a mix thereof.

In certain embodiments, the fossil-based liquid is a petroleum-based liquid or a derivative thereof.

In certain embodiments, a fossil-based liquid according to the invention may be crude oil petroleum and crude oil petroleum derivative products, e.g. resulting from its process by oil refineries. As an example product from an oil refinery one may cite diesel fuel, fuel oil, furnace fuel oil (FFO), gasoline, heavy fuel oil (HFO), intermediate fuel oil (IFO), jet fuel, marine diesel oil (MDO), marine fuel oil (MFO), marine gas oil (MGO), navy special fuel oil (NSFO) and mix thereof.

In certain embodiments, a biomass-based liquid according to the invention may be algae biofuel, bioethanol, biodiesel, biofuel gasoline, biomethanol, coconut oil, green diesel, palm oil, vegetable oil and a mix thereof.

In practice, one illustrative example of liquid biodiesel that is suitable for the instant invention may be a composition comprising palm oil, namely a Malaysian biodiesel or a LOF biodiesel, which latter has been used in the examples herein.

In certain embodiments, the organic phase comprises a synthetic fuel, notably obtained from biomass and/or fossil reagents.

Within the scope of the invention, the organic phase may comprise aliphatic hydrocarbons such as for instance hexane, heptane, octane or nonane; inert cycloaliphatic hydrocarbons such as cyclohexane, cyclopentane or cycloheptane; aromatic hydrocarbons such as benzene, toluene, ethylbenzene, xylenes, or liquid naphthenes; alcohols such as butanol, ethanol, methanol or propanol; and a mix thereof.

In certain embodiments, the organic phase represents between 50% and 75% by weight of the total weight of the suspension.

Additives

The slurry suspension of the present invention may also comprise at least one additive commonly used in the field. Such additive may be, without limitation, a humectant, a corrosion inhibitor, a foam inhibitor, a lubricant, a stabilizer, a biocidal preservative and mix thereof.

In certain embodiments, the additive(s) represent(s) from 0.001% to 2%, preferably from 0.1% to 1% by weight of the total weight of the suspension.

Viscosity of the Slurry Suspension

The rheological properties of the suspensions may be measured by any suitable method known from the state of the art, and preferably using a rheometer under controlled shear rate conditions.

In practice, viscosity is measured in low shear conditions, i.e. between 0.04 $s^{-1}$ to 1 $s^{-1}$, and in high shear conditions, i.e. between i.e. between 40 $s^{-1}$ and 400 $s^{-1}$, at a fixed temperature, preferably at a temperature ranging from 20° C. to 80° C., depending on the nature of the organic phase.

In certain embodiments, the viscosity is preferably measured at a temperature ranging from 20° C. to 40° C., preferably at ambient temperature, notably when the organic phase comprises diesel or biodiesel.

In practice, when measured at a temperature of 25° C., in low shear conditions, i.e. between 0.04 $s^{-1}$ to 1 $s^{-1}$ the viscosity of a slurry suspension may be comprised from 0.1 Pa·s to 50 Pa·s, whereas in high shear conditions, i.e. between 40 $s^{-1}$ and 400 $s^{-1}$, the viscosity of a slurry suspension may be comprised from 0.01 Pa·s to 5 Pa·s.

In certain embodiments, the viscosity is preferably measured at a temperature ranging from 50° C. to 80° C., preferably from 65° C. to 75° C., notably when the organic phase comprises Malaysian biofuel or LOF biofuel.

In practice, when measured at a temperature of 70° C., in low shear conditions, i.e. between 0.04 rotations/s and 1 rotations/s, the viscosity of a slurry suspension may be comprised from 1 kPa·s to 1 MPa·s, whereas in high shear conditions, i.e. between 40 $s^{-1}$ and 400 $s^{-1}$, the viscosity of a slurry suspension may be comprised from 10 mPa·s to 10 Pa·s.

Methods

In another aspect, the invention relates to a method for the preparation of a slurry suspension according to the instant invention comprising at least the mixing of:

a) carbonaceous material particles having an average diameter $D_{50}$ comprised between 0.1 µm and 200 µm;

b) an organic compound comprising at least one amine group; and c) an organic phase, and optionally d) a viscosity controlling agent.

In practice, the preparation of the slurry suspension consists in mixing the ingredient together under appropriate agitation.

In certain embodiments, the organic phase, the organic compound comprising at least one amine group and optionally the viscosity controlling agent are mixed together under proper agitation until a homogeneous suspension/solution is obtained. The carbonaceous material particles are subsequently added under proper agitation until a homogeneously dispersed slurry suspension is obtained.

In another aspect, the invention relates to a method for generating power comprising combustion of the slurry suspension according to the instant invention.

Hence, the slurry suspension according to the invention is particularly adapted for collective heating, power station, industrial heating, marine fuel (thermal engines).

In addition, because of the nature of the particles, these slurry suspensions may be employed in any combustion technologies where heavy fuel oil may be used.

Uses

In another aspect, the invention also relates to the use an organic compound comprising at least one amine group and optionally a viscosity controlling agent for providing a stable and redispersible slurry suspension comprising carbonaceous material particles having an average diameter $D_{50}$ comprised between 0.1 µm and 200 µm.

The inventors have observed that a suspension according to the invention is stable for a period of time of at least 2 days to at least 2 weeks.

However, after a longer period of time sedimentation may occur. The suspension can be manipulated in a way to form a stable suspension for another period of at least 2 weeks. In other words, a suspension according to the invention may be easily redispersed.

The slurry suspension according to the invention hence provides alternative liquid fuel formulations having excellent combustion properties, resulting in low sulphur emission. Moreover, these slurry suspensions can be used as liquid fuel into existing boiler applications, without or with minor changes in existing nozzles and hydraulic settings.

EXAMPLES

Example 1

Preparation of Torrefied Wood Particles

The torrefied wood chips are obtained by torrefaction and chips have cm scale average size. Torrefied wood chips are grinded following a dry grinding protocol to obtain particles with an average size of 300 µm to 1 mm. These particles, in the form of a powder is subsequently dried milled by using a Retsch ZM200 dry miller with the following features: grid 120 µm, speed 18000 rpm, 25° C., nitrogen purge, 80 g per batch in 10 min. At the end of the milling process, particles display a particle size distribution, measured with Sympatec laser diffraction sensors, as follows: $D_{10}$=6 µm; $D_{50}$=23 µm; $D_{90}$=60 µm.

Example 2

Preparation of Torrefied Wood Particles/Heavy Fuel Oil Slurry

Torrefied wood particles obtained according to example 1 are formulated in a mix comprising heavy fuel oil and Fentamine AO (oleylamine, CAS n° 112-90-3).

The Brookfield viscosity of the 2 formulations is measured at slow agitation (10 rpm) or higher agitation (100 rpm) and is given in Table 1.

TABLE 1

|  | Formula 1 (w %) | Formula 2 (w %) |
| --- | --- | --- |
| Heavy fuel oil (HFO) | 69.10 w % | 74.25 w % |
| Fentamine AO | 0.90 w % | 0.75 w % |
| Torrefied wood particles | 30.00 w % | 25.00 w % |
| Brookfield viscosity at 10 rpm | 13 Pa · s | 5.5 Pa · s |
| Brookfield viscosity at 100 rpm | 8.8 Pa · s | 4.5 Pa · s |

Fentamine AO enhances the torrefied biomass wettability in the organic phase (heavy fuel oil) in order to facilitate the powder incorporation to make the slurry. Fentamine AO also helps avoid hard surface sediment but redispersible particles with soft agitation.

Example 3

Palm Oil/Torrefied Wood Particles Slurries

30% of torrefied wood particles obtained according to example 1 are formulated in a mix comprising 68% of palm oil (LOF-type) and 2% of an organic compound comprising at least one amine group. Stability of the slurries comprising various organic compounds comprising at least one amine group is evaluated by sedimentation after a period of 2 days and a period of 2 weeks with no agitation, as assessing phases separation.

A score of 1 to 5 is given to each formulation, 1 representing a very stable composition with no or very little sedimentation and 5 representing an instable composition with heavy sedimentation.

TABLE 2

| formulation | nature of the surfactant | stability after 2 days (score) | stability after 2 weeks (score) |
| --- | --- | --- | --- |
| 1 | None | 5 | 5 |
| 2 | Fentamine DMA 1697 | 2 | 3 |
| 3 | Fentamine DMA 1895 | 2 | 3 |
| 4 | Fentacare D 1821 | 1 | 3 |
| 5 | Fentamine A-CO | 1 | 2 |
| 6 | Ethylenediamine | 1 | 1 |
| 7 | Fentamine DA 102 | 1 | 4 |
| 8 | Fentamine DAT | 3 | 3 |
| 9 | Fentamine AT | 2 | 2 |
| 10 | Fentacare 1831 | 4 | 5 |
| 11 | Fentamine A18 | 1 | 2 |
| 12 | Fentamine DMA 1095 | 4 | 4 |
| 13 | Fentamine DMA 1297 | 4 | 4 |
| 14 | Fentamine DMA 1816 | 4 | 4 |
| 15 | Fentacare D 1021 | 3 | 2 |

First, the stability of the formulation without organic compound comprising at least one amine group is the worst Amine surfactant fentamine D 1821, fentamine A-CO, ethylenediamine, fentamine DA 102, and fentamine A18 provides very stable slurries after 2 days. The effect of stabilization of ethyleneamine is observed after 2 weeks, whereas the other organic compounds comprising at least one amine group maintain an acceptable stability of the slurries.

Example 4

Viscosity of Palm Oil/Torrefied Wood Particles Slurries in the Presence of Ethylenediamine 30% of torrefied wood particles obtained according to example 1 are formulated in a mix comprising palm oil (LOF-type) in the absence or the presence of 2% of ethylenediamine as the organic compound comprising at least one amine group (see example 3).

Viscosity is measured at different shear rate conditions, at a temperature of 70° C. with a rheometer type est AR2000ex (Texas Instrument). FIG. 1 shows that the average viscosity of the slurry composition in the presence of 2% ethylenediamine (open circles) is higher than the slurry formulated in the absence of ethylenediamine (closed circles).

Moreover, the viscosity of the slurry formulated in the presence of 2% of ethylenediamine varies from 1 Pa·s to $1.E^5$ Pa·s within a range of shear rate varying from $2.E^{-2}.s^{-1}$ (low shear conditions) to $4.E^2.s^{-1}$ (high shear conditions).

Example 5

Diesel/Torrefied Wood Particles Slurries

Slurries are prepared by mixing diesel, 42% wt of torrefied wood (25 µm; obtained from example 1) and 2% wt of Fentamine AO in the presence or absence of a viscosity controlling agent. In order to maximize stability, it was advantageous to add a low percent of additives, e.g. Bentone, to provide a threshold character and to minimize sedimentation. Results are mentioned in Table 3 below:

TABLE 3

|  | Formula 1 (w %) | Formula 2 (w %) | Formula 3 (w %) | Formula 4 (w %) |
| --- | --- | --- | --- | --- |
| Diesel | 58 | 56 | 55 | 54 |
| Torrefied wood particles | 42 | 42 | 42 | 42 |
| Fentamine AO | — | 2 | 2 | 2 |
| Bentone gel | — | — | 1 | — |
| Bentone powder | — | — | — | 2 |
| Stability | heavy packed sediment within 2 days | sediment within 2 days | sediment after two weeks | sediment after two weeks |
| Dispersibility of sediments | non dispersible | dispersible after mild agitation | dispersible after soft agitation | dispersible after soft agitation |

The presence of a organic compound comprising at least one amine group, Fentamine AO, results in slurries that are dispersible after mild agitation. A low percent of Bentone (gel or powder) allows slowing sedimentation in order to provide easier dispersion of the sediments of the suspension after soft agitation.

The invention claimed is:

1. A slurry suspension comprising:
   (a) carbonaceous material particles having an average diameter $D_{50}$ from 0.1 μm to 200 μm;
   (b) an organic compound comprising at least one amine group, wherein the organic compound comprising at least one amine group is an amine of formula (V):

$$H_2N-R1-NH_2 \quad (V)$$

wherein R1 represents a saturated or unsaturated, linear, branched or cyclic, aliphatic or aromatic hydrocarbon chain of $C_2$-$C_{22}$; and
   (c) an organic phase.

2. The suspension according to claim 1 wherein said suspension further comprises (d) a viscosity controlling agent.

3. The suspension according to claim 1 wherein said carbonaceous material particles are selected from a group consisting of a vegetal biomass, a coal, a coke, a graphite, a char, a biocoal and a mix thereof.

4. The suspension according to claim 3 wherein the vegetal biomass is a torrefied vegetal biomass.

5. The suspension according to claim 1 wherein the carbonaceous material particles provide the size distribution as follows:
   $D_{10}$ from 1 to 50 μm, and
   $D_{90}$ from 50 to 500 μm.

6. The suspension according to claim 1 wherein the carbonaceous material particles represent from 25% to 50% by weight of the total weight of the suspension.

7. The suspension according to claim 1 wherein the organic compound comprising at least one amine group is ethylene diamine.

8. The suspension according to claim 1 wherein the organic compound comprising at least one amine group represents from 0.1% to 5% by weight of the total weight of the suspension.

9. The suspension according to claim 1 wherein the organic phase is selected from a group consisting of a fossil-based liquid and a derivative thereof, a biomass-based liquid and a derivative thereof, and a mix thereof.

10. The suspension according to claim 9 wherein the fossil-based liquid is a petroleum-based liquid or a derivative thereof.

11. The suspension according to claim 1 wherein the organic phase represents from 50% to 75% by weight of the total weight of the suspension.

12. The suspension according to claim 2 wherein the viscosity controlling agent is selected from a group consisting of clay powder, clay gel, a hydrogenated castor oil, carbon black and a mix thereof.

13. A method for the preparation of a slurry suspension according to claim 1, the method comprising at least the mixing of:
   (a) carbonaceous material particles having an average diameter $D_{50}$ from 0.1 μm to 200 μm;
   (b) an organic compound comprising at least one amine group, wherein the organic compound comprising at least one amine group is an amine of formula (V):

$$H_2N-R1-NH_2 \quad (V)$$

wherein R1 represents a saturated or unsaturated, linear, branched or cyclic, aliphatic or aromatic hydrocarbon chain of $C_2$-$C_{22}$; and
   (c) an organic phase, and optionally
   (d) a viscosity controlling agent.

14. A method for generating power, the method comprising combustion of the slurry suspension according to claim 1.

15. A method for providing a stable and redispersible slurry suspension comprising carbonaceous material particles having an average diameter $D_{50}$ from 0.1 μm to 200 μm, the method comprising using an organic compound comprising at least one amine group and optionally a viscosity controlling agent.

16. The suspension according to claim 4 wherein the vegetal biomass is torrefied wood particles.

17. The suspension according to claim 3, wherein said carbonaceous material particles are biocoal.

18. The suspension according to claim 3, wherein said carbonaceous material particles are coal.

19. The suspension according to claim 18, wherein the coal is selected from a group consisting of anthracite, semi-anthracite, charcoal, solvent refined coal, medium and high-volatile bituminous, sub-bituminous and lignite coals.

* * * * *